(12) United States Patent
Schweiger et al.

(10) Patent No.: US 11,703,409 B2
(45) Date of Patent: Jul. 18, 2023

(54) PRESSURE SENSOR WITH REDUCED MEASUREMENT ERROR

(71) Applicant: SICK AG, Waldkirch (DE)

(72) Inventors: Stefan Schweiger, Waldkirch (DE); Thomas Weber, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 17/585,762

(22) Filed: Jan. 27, 2022

(65) Prior Publication Data
US 2022/0236130 A1    Jul. 28, 2022

(30) Foreign Application Priority Data

Jan. 28, 2021 (DE) .......................... 102021101883.8

(51) Int. Cl.
*G01L 19/00* (2006.01)
*G01L 19/04* (2006.01)
*G01L 19/14* (2006.01)

(52) U.S. Cl.
CPC ...... *G01L 19/0038* (2013.01); *G01L 19/0092* (2013.01); *G01L 19/04* (2013.01); *G01L 19/14* (2013.01)

(58) Field of Classification Search
None
See application file for complete search history.

(56) References Cited

U.S. PATENT DOCUMENTS

| | | | | |
|---|---|---|---|---|
| 9,841,340 B1* | 12/2017 | Harthan | ............... | G01L 19/0038 |
| 2007/0197922 A1* | 8/2007 | Bradley | ............... | G01L 19/0023 |
| | | | | 600/488 |
| 2010/0218612 A1* | 9/2010 | Ohtani | ................... | G01L 15/00 |
| | | | | 73/716 |
| 2014/0107527 A1* | 4/2014 | Dijkman | ............... | A61B 5/205 |
| | | | | 600/561 |
| 2019/0234823 A1* | 8/2019 | DeRosa | ................. | G01L 19/14 |

FOREIGN PATENT DOCUMENTS

| | | | |
|---|---|---|---|
| CN | 202719310 U | | 2/2013 |
| EP | 3400867 A1 | * | 11/2018 |
| EP | 3400867 A1 | | 11/2018 |
| JP | H11118648 A | | 4/1999 |
| JP | H11183292 A | | 7/1999 |
| JP | 2003294561 A | | 10/2003 |
| JP | 200453329 A | | 2/2004 |
| WO | 2007126503 A2 | | 11/2007 |

OTHER PUBLICATIONS

German Office Action dated Oct. 4, 2021 corresponding to application No. 102021101883.3.

* cited by examiner

*Primary Examiner* — Lisa M Caputo
*Assistant Examiner* — Nigel H Plumb
(74) *Attorney, Agent, or Firm* — Nath, Goldberg & Meyer; Jerald L. Meyer (57) ABSTRACT

A pressure sensor is provided. The pressure sensor includes a housing with a control and evaluation unit. A plurality of pressure ports are arranged at the housing of the pressure sensor, with a pressure measuring cell being associated with every pressure port. The pressure measurement cells are connected to the control and evaluation unit, and the pressure sensor has at least one digital output interface. At least one pressure port is a port for inserting a pressure line, with the pressure line being installable without tools and with the pressure line being surrounded by a seal of the pressure port and being secured against being pulled out.

13 Claims, 9 Drawing Sheets

PRESSURE SENSOR WITH REDUCED MEASUREMENT ERROR

The present invention relates to a pressure sensor having a housing with a control and evaluation unit, wherein a plurality of pressure ports are arranged at the housing of the pressure sensor.

In accordance with the prior art in industrial automation technology, a large number of one-channel sensors are used at a measurement site to evaluate a plurality of pressure measurement sites. The signals of the individual pressure sensors are collected and evaluated by one or more central controllers and the results are forwarded.

Large space requirements are thereby produced since a large number of one-channel sensors have to be arranged. A high assembly effort is likewise associated therewith since a large number of fastenings are required and a lot of assembly material is required in an expensive manner. There is furthermore disadvantageously a high cabling effort since every single one-channel sensor has to be electrically connected. Large controllers having a large number of inputs and outputs are required for the evaluation. A complex programming of the controller is furthermore required. Due to the dependence on a very large number of sensors, the mean time to failure (MTTF) is furthermore reduced.

U.S. Pat. No. 9,841,340 B1 discloses a pressure measurement apparatus comprising a plurality of air inlets that are configured to respectively receive one of a plurality of different air streams. A valve arrangement is provided that is configured to switch the operation of the pressure measurement device between a measurement operating mode and a servicing mode, with the valve arrangement comprising a plurality of inputs that are coupled to the respective air inlets and that are configured such that they receive the respective air inlets and a plurality of outputs.

It is an object of the invention to provide an inexpensive and compact sensor solution for the detection of a plurality of pressure channels.

The object is satisfied by a pressure sensor having a housing with a control and evaluation unit, wherein a plurality of pressure ports are arranged at the housing of the pressure sensor, wherein a pressure measuring cell is associated with every pressure port, wherein the pressure measurement cells are connected to the control and evaluation unit, wherein the pressure sensor has at least one digital output interface, and wherein at least one pressure port is a port for inserting a pressure line, with the pressure line being installable without tools and with the pressure line being surrounded by a seal of the pressure port and being secured against being pulled out.

The pressure sensor in accordance with the invention can be used wherever a large number of pressure measurements have to take place in a very tight space. In this respect, a plurality of pressure measurements of, for example, 4, 8, 16, 32, or more individual pressure measurements are possible.

An example for such a use or application is a matrix of pneumatic vacuum grippers. These grippers are arranged in a pattern of 4×8, for example. Such a system receives the feedback as to which gripping procedure has been successfully carried out.

A further application results from the context of Industry 4.0. In this respect, the recording of additional measurement data is relevant to obtain conclusions on the state of the system and its components. A simple and central provision of a number of pressure measurement points is also made possible here in accordance with the invention.

Only the data detection in the pressure sensor is multiplied in accordance with the invention. The data evaluation and the data output by means of the control and evaluation unit and the housing are only present in a single version. A plurality of pressure values or process values can thereby be detected in the same housing.

On the use of only one single control and evaluation unit for data evaluation and data output, considerable saving potentials result in the manufacturing costs and in space usage. The use of one housing for all the components simplifies the mechanical design and reduces the number of required plug-in connections and potential error sources. The accommodation of a plurality of pressure measurements in one housing therefore produces economies of scale.

The pressure port is a port for inserting a pressure line, with the pressure line being installable without tools and with the pressure line being surrounded by a seal of the pressure port and being secured against being pulled out. Such pressure ports are also called push-in fitting ports. An installation of the pressure line to be connected can take place simply manually without any tools being required. The pressure line is inserted into a circular cylindrical mount for this purpose. On the pushing in, the pressure line is surrounded by at least one annular seal and is simultaneously latched, for example by means of an annular latching ring having inwardly facing latching tongues that are displaced or bent over by the introduced pressure line. If the tube is pulled, the latching tongues cant or catch in the surface of the pressure line and prevent a pulling out.

To pull the pressure line out, an annular unlatching device that can likewise be actuated by hand without tools is provided at the pressure port. The annular unlatching device is pressed in the direction of the pressure port, whereby the latching tongues of the latching ring are removed from the surface of the pressure line, whereby the pressure line is no longer latched and the pressure line can be removed and pulled out of the pressure port simply by hand.

Due to the simplicity of the pressure port and due to flexible pressure lines, the pressure ports can be used simply without the pressure ports having to be exactly positioned and without threaded connections being provided, and the connection can be made without tools.

The pressure ports are provided for an absolute pressure measurement, for example. In this respect, every pressure measurement cell belonging to the pressure port is read in individually by the control and evaluation unit and the measured value is provided or output by the control and evaluation unit on the output interface.

A relative pressure measurement is, however, preferably predominantly provided, wherein the individual pressure measurement cells measure relatively against the environmental pressure. This relative measurement is very useful in pneumatics.

The pressure measurement cell is obtained as an SMD component, for example, and is mounted on a circuit board. An integrated pressure measurement cell can have the following appearance:

The adaptation to the process takes place by means of a mount at the upper side of the SMD component that is integrated with an exact fit and in a pressure tight manner in the housing. An O ring is for this purpose, for example, placed around a nose of the pressure measurement cell and takes care of the sealing between the housing, in particular the pressure port, and the SMD pressure measurement cell, in a cutout in the housing. The circuit board is then fixedly screwed to the housing in the region of the process port.

This adaptation has to compensate the location tolerances between the circuit board, the mounting tolerances of the SMD components on the circuit board, and component tolerances and housing tolerances, and must simultaneously ensure the compressive strength of the process pressure.

The pressure sensor in accordance with the invention having the housing and the plurality of pressure ports is a compact device that required less construction space than individual sensors in individual housings in accordance with the prior art. The pressure sensor in accordance with the invention is inexpensive in manufacture and so available more cheaply for users. An integration, that is an installation, into a plant is furthermore simpler since less wiring effort and less assembly effort is required. The pressure sensor is furthermore less susceptible to error since fewer individual components have to be installed. A smaller parameterization effort is furthermore also required since only one single control and evaluation unit is required.

In a further development of the invention, at least one pressure port is a G ¼ IG, G ¼ AG, or a ¼" NPT pressure port of the pressure sensor. Different connections are thus provided at the pressure sensor, whereby the pressure sensor can be used in a more versatile manner.

A G ¼ IG connection is a connection having a ¼ inch internal thread for a high pressure connection. A stable pressure port that is, however, simple to release and suitable for high pressures is provided by the internal thread screw connection.

A G ¼ AG connection is a connection having a ¼ inch external thread for a high pressure connection.

A ¼ NPT connection is a connection having a ¼ inch external thread for a high pressure connection A stable pressure port that is, however, simple to release and suitable for high pressures is provided by the external thread screw connection. Such a high pressure connection can be designed for pressures up to a pressure of several hundred bar.

In a further development of the invention, different pressure ports are associated with different pressure ranges. Different pressure ranges can thereby be evaluated and monitored by a single pressure sensor. The pressure sensor can thereby be used more versatilely.

In a further development of the invention, at least one first pressure range has the range from 0 to 10 bar and at least one second pressure range has the range from 0 to 16 bar. A pressure range from 0 to 10 bar is, for example, the most favored pressure range for pneumatic applications in machines. The pressure in a plant typically amounts to 6 to 7 bar. To control pressure peaks that may occur, 0 to 10 bar should mostly be selected to have a more robust pressure sensor. A pressure range of 0 to 16 bar is present in the pneumatic supply, i.e. upstream of the pressure reducing devices of the individual plants.

In a further development of the invention, a differential pressure measurement can be carried out between two pressure ports.

In this process, for example, two pressure ports or two pressure channels are used for the differential pressure measurement. A digital differential pressure measurement takes place here, for example, with two pressure channels or two pressure measurement cells producing a digital differential pressure measurement value as an absolute value in each case. This is also called "electrical differential pressure". It is, for example, possible for all pressure ports, with two pressure ports always forming a differential pressure channel. The differential pressure channel can also be provided for all the measurement ranges.

Two pressure ports or process connections are provided per pressure channel in a differential pressure measurement. The pressure sensor can also measure the difference between the two process connections using a single pressure measurement cell, that is a relative measurement. In contrast to the absolute measurement, this offers the advantage that only one single pressure measurement cell is required per pressure channel. The great advantage of a differential pressure measurement using a pressure measurement cell is that the differential pressure can be determined substantially more accurately since the errors of the individual measurements are not present and the measurement range can be selected as substantially smaller. A differential pressure measurement using two independent pressure measurement cells, that is a respective absolute pressure measurement, produces higher measurement accuracy.

A simple flow measurement between two pressure ports can furthermore be provided. A diaphragm is arranged between the pressure ports for this purpose and the pressure measurement cell is configured to determine a flow quantity. This is in particular provided for small measurement ranges from 0 to 0.5 bar.

A true differential pressure measurement is provided as the differential pressure measurement, for example. In this respect, a differential pressure measurement cell is used as the pressure measurement cell. It has two pressure ports and determines the differential pressure between these two pressures. This measurement is very precise and can also be used for small measurement ranges. This design requires two pressure ports or process connections and special measurement cells per pressure channel. This process is thus admittedly technically more accurate, but cannot be used for a classical relative pressure measurement.

Two relative pressure measurement cells are used as the pressure measurement cell in a digital differential pressure measurement. They are both evaluated individually. The difference formation takes place subsequently by offsetting the two pressure values. It is not possible to achieve such accurate measurement values in comparison with a true differential pressure measurement here. The method is thus less suitable for small measurement ranges. The function is implemented via the evaluation, for example evaluation software. The product can thus be individually adapted to customer wishes.

Said differential pressure measurement can be used in a flow measurement. A differential pressure is required for this kind of flow measurement. This differential pressure is detected between two measurement sites, with one measurement site being located upstream of a diaphragm, for example a defined interference point or a constriction in the measurement channel, and one measurement site being located downstream of the diaphragm. A conclusion on the flow rate can be made with knowledge of the information on the pressure drop and the model, namely a geometrical design of the diaphragm. Since the differential pressure is very small here, a real differential pressure measurement delivers better results.

A filter monitoring works according to the same principle. One pressure measurement is here carried out upstream of the filter and one pressure measurement is carried out downstream of the filter. The filter clogs and the resistance increases due to the contamination of the filter. The increased resistance provides a greater pressure drop over the filter The use of differential pressure measurement cells enables better results for the flow measurement and for a filter monitoring.

In a further development of the invention, the output interface is at least one IO link interface. A communication system for linking intelligent sensors and actuators to an automation system in the standard IEC 61131-9 under the name "single-drop digital communication interface for small sensors and actuators" (SDCIs) is standardized under the name IO link. The standardization here comprises both the electrical connection data and a digital communication protocol via which the sensors and actuators enter into data exchange with the automation system.

An IO link system comprises an IO link master and one or more IO link devices, that is sensors, namely the pressure sensor or actuators. The IO link master provides the interface to, for example, a superposed controller (programmable logic controller, PLC) and controls the communication with the connected IO link devices, in particular with the pressure sensor.

An IO link master can have one or more IO link ports to which only one respective device can be connected. It can also be a hub that, as a concentrator, enables the connection of classically switching sensors and actuators.

An IO link device can be an intelligent sensor, namely pressure sensor, an actuator, a hub, or, however, due to the bidirectional communication, also a mechatronic component, e.g. a gripper or a power pack having an IO link connection. With respect to IO link, intelligent means that a device, that is the pressure sensor, has identification data, e.g. a type designation and a serial number or parameter data, e.g. sensitivities, switching delays, or characteristics, that can be read or written over the IO link protocol. The changing of parameters can thus take place in part in ongoing operation by the PLC. But intelligent also means that the pressure sensor can deliver detailed diagnostic information.

The parameters of the sensors, in particular of the pressure sensor and of the actuators, are specific to the device and technology; there is therefore information on every device in the form of an IODD (IO device description) using the description language XML.

Up to 32 bytes can be mapped via IO link process data. The number of possible pressure values in the process datum scales in dependence on the transferred pressure values. The following table provides an overview of exemplary values:

| Resolution of pressure values in the process datum | Maximum number of pressure values in the process datum (32 bytes/256 bits) | Possible data types | Information |
| --- | --- | --- | --- |
| 32 bit | 8 | Float32, Int32, UInt32, etc. | Pressure value |
| 24 bit | 10 | Int24, UInt24, etc. | Pressure value |
| 16 bit | 16 | Int16, UInt16, etc. | Pressure value |
| 8 bit | 32 | Int8, UInt8, etc. | Pressure value |
| 1 bit | 256 | Bool, etc. | Switching state |

As already mentioned, handling units having a large number of pressure measurement sites represent an advantageous use of the multi-channel pressure sensor. The pressure sensor is here seated directly on the gripper or robot arm. An actuator system or a control element that has to be controlled by a machine control is also located at this position of the handling unit. The pressure sensor provides electrical output signals to further reduce the cabling effort between the handling unit and the control.

Parameter inputs for the pressure sensor by which a controller can switch the outputs of the pressure sensor are provided via an interface, in particular the IO link interface.

Pneumatic valves or electrical actuators can be switched by the output signals. Additional digital inputs signals can be advantageous to evaluate further sensor signals such as the location information of grippers.

The pressure sensor can, however, for example, also have digital inputs and digital outputs. If the pressure sensor, for example, has the IO link interface and, for example, eight digital inputs and outputs, a user can then control these eight inputs and outputs via IO link.

In a further development of the invention, an output interface is at least one Ethernet interface.

Ethernet is a technology that specifies software (protocols, etc.) and hardware (cables, distributors, network cards, etc.) for cabled data networks and is also called a LAN technology. It allows the exchange of data in the form of data frames between the devices connected in a local network (LAN), namely the pressure sensor and other devices such as a higher ranking controller. Currently, transmission rates of 1, 10, 100 megabits/s (fast Ethernet), 1000 megabit/s (gigabit Ethernet), 2.5, 5, 10, 40, 50, 100, 200, and 400 gigabits/s are specified.

The Ethernet protocols comprise assessments for cable types and plugs as well as for transfer forms, namely the signals on the bit transfer layer, and packet formats. In the OSI model, both the physical layer (cf. OSI layer 1) and the data link layer (cf. ISO layer 2) are fixed by Ethernet. Ethernet vary largely corresponds to the IEEE standard 802.3.

An Ethernet device can be an intelligent sensor, namely the pressure sensor, an actuator, a hub, or, however, due to the bidirectional communication, also a mechatronic component, e.g. a gripper having an Ethernet connection. With respect to an Ethernet device, intelligent means that a device, that is the pressure sensor, has identification data, e.g. a type designation and a serial number or parameter data, e.g. sensitivities, switching delays, or characteristics, that can be read or written over the Ethernet protocol. The changing of parameters can thus take place in part in ongoing operation by the PLC. But intelligent also means that the pressure sensor can deliver detailed diagnostic information.

The parameters of the sensors, in particular of the pressure sensor and of the actuators, are specific to the device and technology; there is therefore information on every device in the form of a device description using the description language XML Non-real time capable protocols such as htpp, MQTT, OPC. UA, and Modbus were be provided for monitoring applications here.

In a further development of the invention, an output interface is at least one fieldbus interface. A fieldbus is a bus system that connects field devices such as the pressure sensor or other sensors, sensing elements and control elements or actuators in a plant for communication with an automation device. If a plurality of communication participants transmit their messages over the same line, it must then be determined who transmits what, namely measured values and commands, when, and with which identification on the fieldbus. Standardized protocols are provided for this.

Provided fieldbuses are, for example Profibus, Interbus, CANopen, EtherCAT, Ethernet/IP, PROFINET, etc.

In a further development of the invention, at least control buttons are arranged at the housing. The pressure sensor can be simply operated, parameterized, or configured using the control buttons. The control buttons are, for example, formed as membrane keys or capacitive keys or similar.

In a further development of the invention, at least one planar display is arranged at the housing. The planar display is, for example, spatially associated with the control buttons. The display and the control buttons together form a user interface for inputting parameters or configurations and likewise for outputting diagnostic information.

In a further development of the invention, the control and evaluation unit is programmable. The control and evaluation unit has a memory for this purpose. The control and evaluation unit in particular also has an additional program memory to store and execute user programs. The user programs can be executed on the control and evaluation unit of the pressure sensor. Individual programs of the user or customer can thus be simply integrated on the pressure sensor. The output signals on the digital output interface can thus already be generated after the user program.

Provision can, however, also be made that the pressure sensor is also programmable via the anyway present firmware in the control and evaluation unit. A web-based or browser-based programming interface can be provided for this purpose.

In a further development of the invention, at least one temperature sensor is arranged in the housing, with the temperature sensor being connected to the control and evaluation unit.

The process temperature can, for example, be detected in this process. For example, the temperature of the pressure medium can be directly detected, whereby useful additional information on the process is available.

The environmental temperature can, for example, also be detected. An additional useful process parameter is thus likewise available.

The temperature or temperatures is/are detected and evaluated continuously or cyclically, for example.

In a further development of the invention, at least one vibration sensor is arranged in the housing, with the vibration sensor being connected to the control and evaluation unit.

The vibration sensor is, for example, directly connected to the housing of the pressure sensor. Vibrations of the process that have been caused can thus be recorded and analyzed.

In a further development of the invention, the pressure port of the pressure measurement cells is connected to the housing via a tube, with a plurality of pressure measurement cells being fastened to a common printed circuit board.

The tolerances between the PCB and the housing can be compensated by a flexible connection between the pressure measurement dell and the housing, for example via the tube. Mechanical displacements that occur can thus in particular be compensated on large temperature changes.

In a further development of the invention, the pressure port of the pressure measurement cell is directly connected to the housing and each pressure measurement cells is arranged on a respective separate printed circuit board.

The process connection of every pressure measurement cell is here directly screwed in the housing. The connection of a pressure measurement cell printed circuit board and of a base module printed circuit board takes place, for example, via plug connectors or flat ribbon cables that enable a tolerance compensation.

A cascadable solution is thereby provided with which pressure sensors having a different number of pressure ports can be implemented with an identical internal design. A number of different variants of pressure sensors can thereby be formed. For this purpose, a base module that is connected to or combined with a number of pressure measurement cells is provided for the production of the pressure sensor. A modular system is thus formed.

In a further development of the invention, the pressure port of the pressure measurement cells is directly connected to the housing, with a plurality of pressure measurement cells being fastened to a common printed circuit board, with the printed circuit board having connection webs between the printed circuit board parts of the pressure measurement cells.

All the components are mounted on one printed circuit board here. The tolerance compensation works, for example, by a mechanical relief of the printed circuit board by milled slots, whereby the connection that is left forms the connection web, or by partly flexible printed circuit boards e.g. at the connection sites, whereby the connection webs are formed.

Provision can, however, also be made to use only completely flexible printed circuit boards.

The invention will also be explained in the following with respect to further advantages and features with reference to the enclosed drawing and to embodiments. The Figures of the drawing show in.

In the following Figures, identical parts are provided with identical reference numerals.

Figure 1:
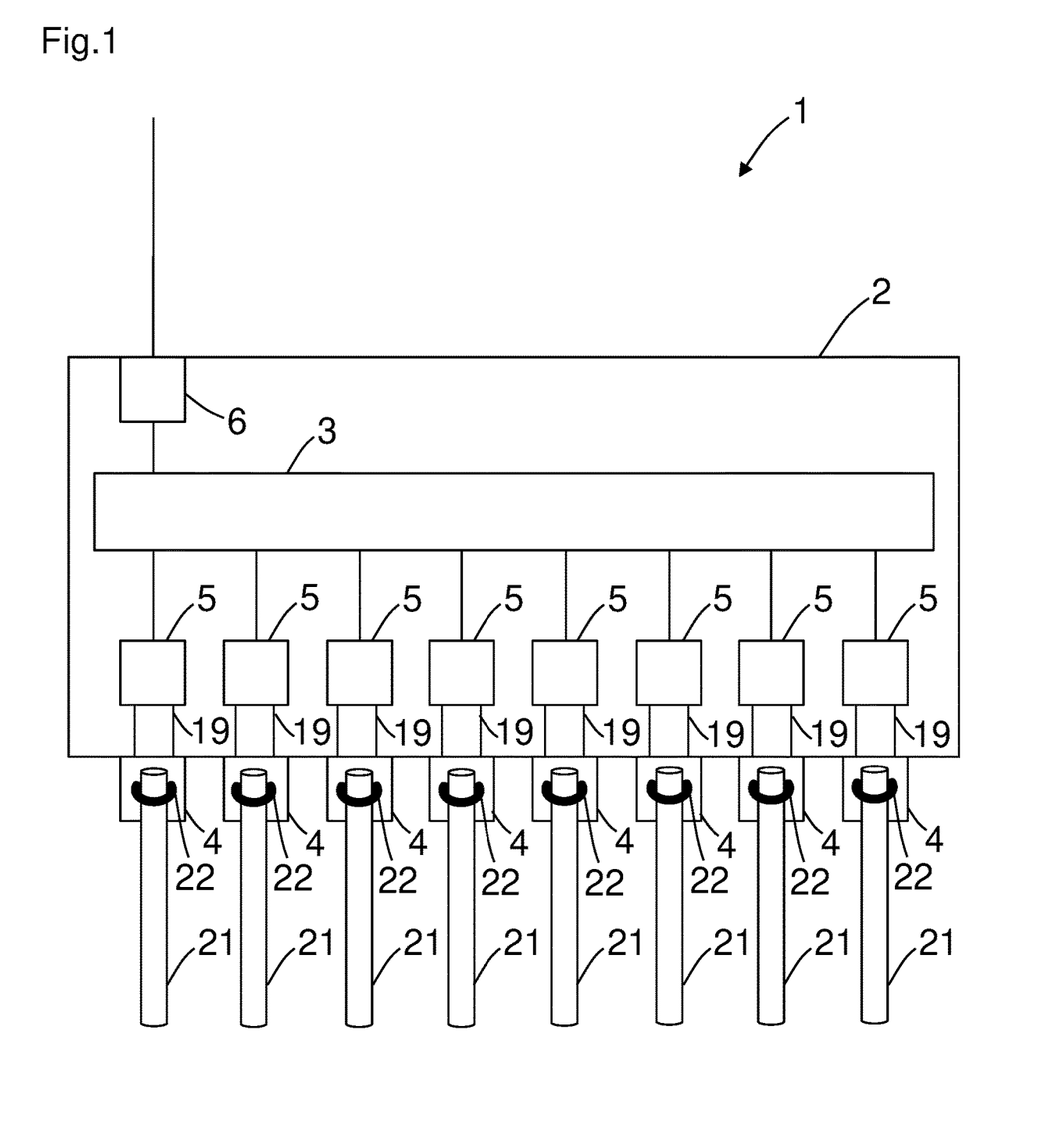
FIG. 1 a schematic representation of a pressure sensor.

FIG. 1 shows a pressure sensor 1 having a housing 2 with a control and evaluation unit 3, wherein a plurality of pressure ports 4 are arranged at the housing 2 of the pressure sensor 1, wherein a pressure measurement cell 5 is associated with every pressure port 4, wherein the pressure measurement cells 5 are connected to the control and evaluation unit 3, wherein the pressure sensor 1 has at least one digital output interface 6, and wherein at least one pressure port 4 is a port for inserting a pressure line 21, with the pressure line 21 being installable without tools and with the pressure line 21 being surrounded by a seal 22 of the pressure port 4 and being secured against being pulled out.

In this respect, for example, a plurality of pressure measurements of, for example, four, eight, sixteen or thirty two, or more individual pressure measurements are possible. In accordance with FIG. 1, eight pressure ports 4 are shown.

Figure 4:
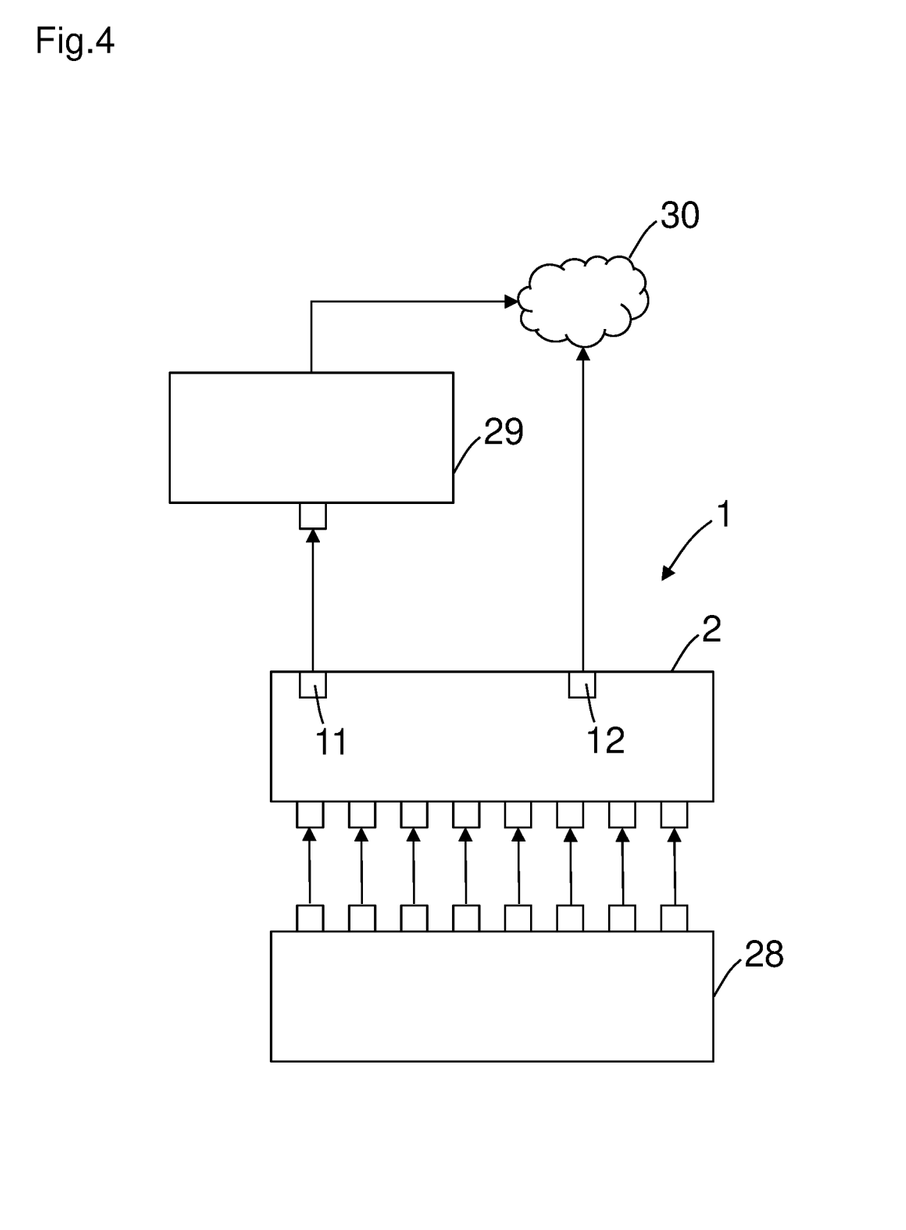
FIG. 4 a schematic representation of a pressure sensor in an application.

FIG. 4 shows the pressure sensor 1 in an application having a vacuum gripper 28, a programmable logic controller 29, and a cloud 30. An example for such a use or application is a matrix of pneumatic vacuum grippers. These grippers are arranged in a pattern of 4×8, for example. Such a system receives the feedback as to which gripping procedure has been successfully carried out.

The data evaluation and the data output by means of the control and evaluation unit 3 and the housing 2 are only present in a single version. A plurality of pressure values or process values can thereby be detected in the same housing 2.

Figure 5:
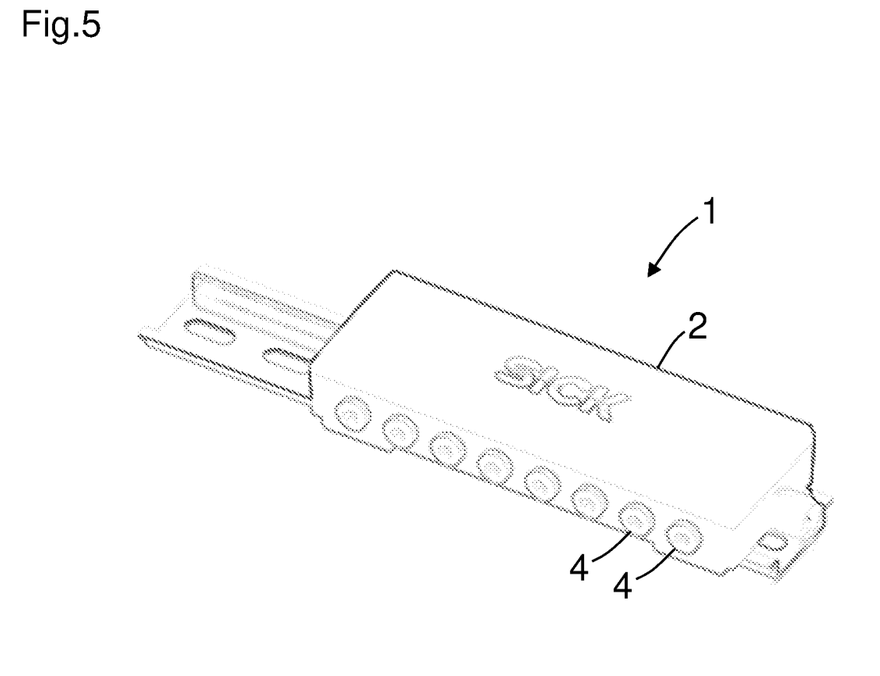
FIG. 5 a housing of a pressure sensor.

FIG. 5 shows by way of example a housing 2 having the pressure ports 4 on a mounting rail or top hat rail.

Figure 6:
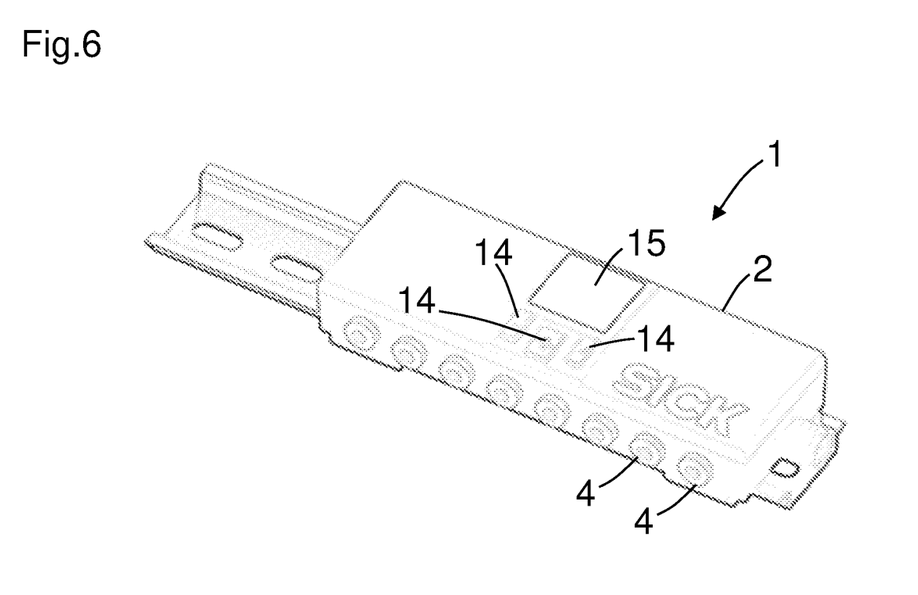
FIG. 6 a housing of a pressure sensor with control buttons and a display.

FIG. 6 shows by way of example a housing 2 having the pressure ports 4 on a mounting rail or top hat rail, wherein the housing has a display 15 and control buttons 14. The pressure sensor 1 can be simply operated, parameterized, or configured using the control buttons 14. The control buttons 14 are, for example, formed as membrane keys or capacitive keys or similar. The planar display 15 is, for example, spatially associated with the control buttons 14. The display 15 and the control buttons 14 together form a user interface for inputting parameters or configurations and likewise for outputting diagnostic information, process data, pressure values, and/or temperature values.

Figure 2:
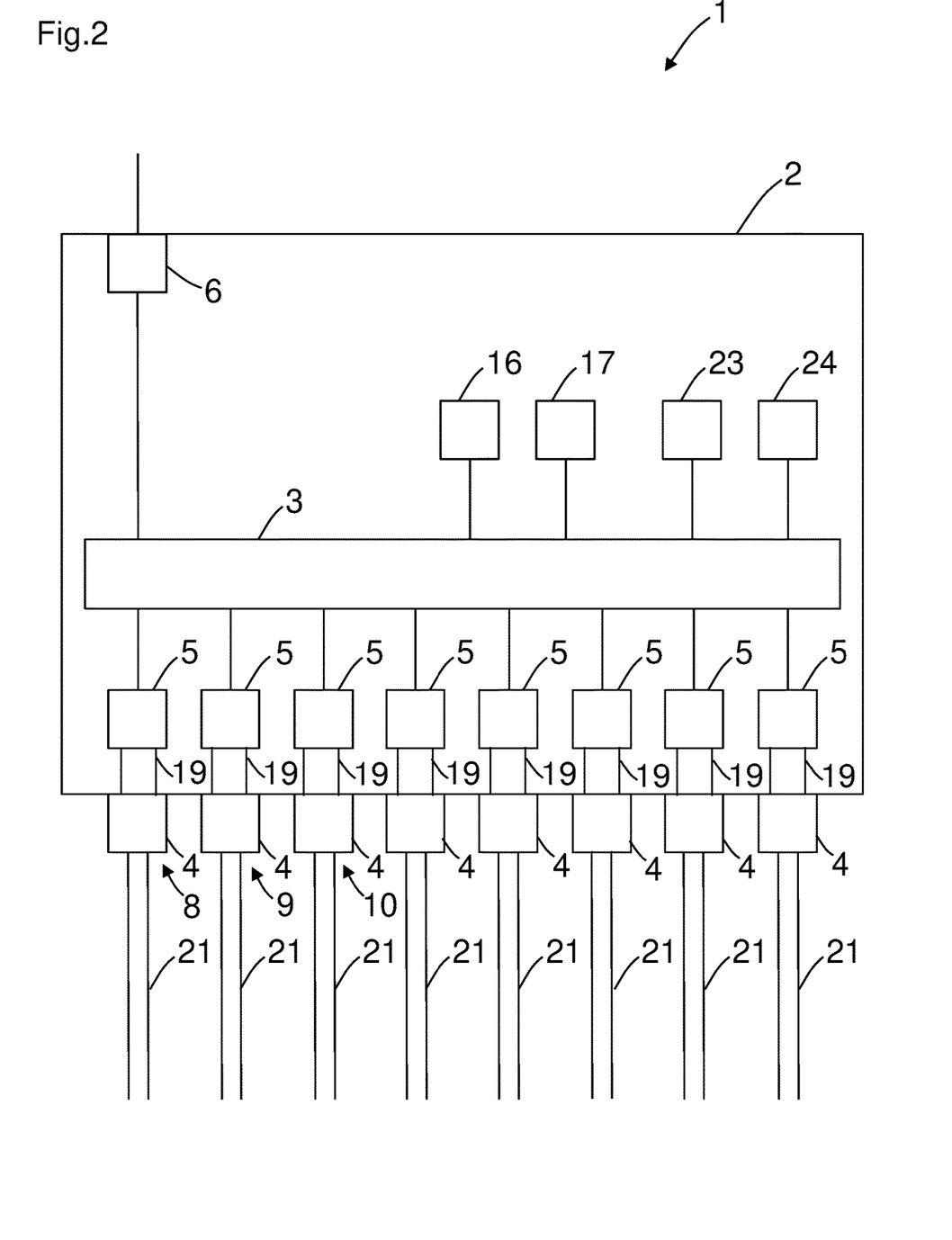
FIG. 2 a further schematic representation of a pressure sensor.

In accordance with FIG. 2, the control and evaluation unit 3 is programmable. The control and evaluation unit 3 has a memory 23 for this purpose. The control and evaluation unit 3 in particular also has an additional program memory 24 to store and execute user programs. The user programs can be executed on the control and evaluation unit 3 of the pressure sensor 1. Individual programs of the user or customer can thus be simply integrated on the pressure sensor 1. The output signals on the digital output interface can thus already be generated after the user program.

Provision can, however, also be made that the pressure sensor 1 is also programmable via the anyway present firmware in the control and evaluation unit 3. A web-based or browser-based programming interface can be provided for this purpose.

Figure 3:
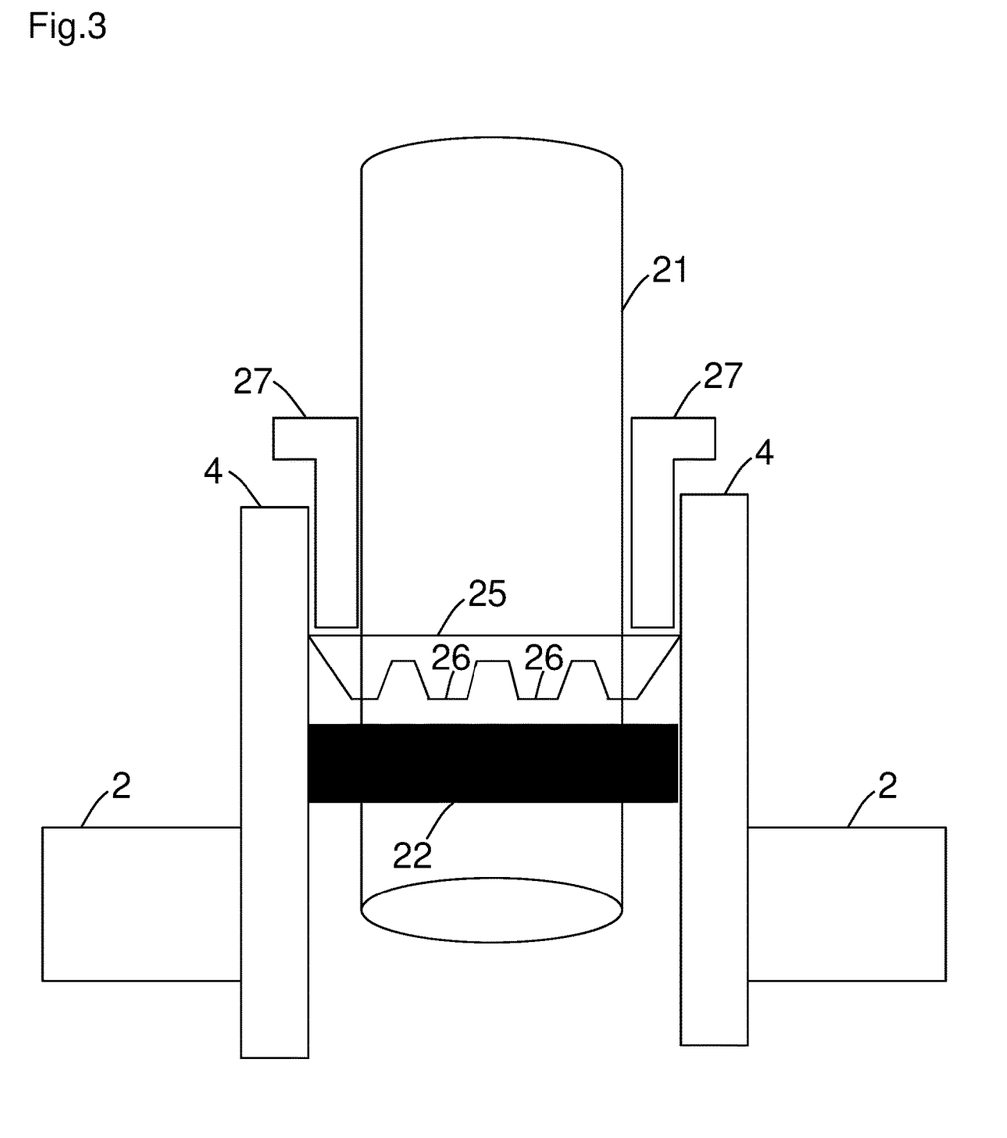
FIG. 3 a schematic representation of a pressure port.

The pressure port 4 is, in accordance with FIG. 3, a port for inserting a pressure line 21, with the pressure line 21 being installable without tools and with the pressure line being surrounded by a seal 22 of the pressure port 4 and being secured against being pulled out. Such pressure ports 4 are also called push-in fitting ports. An installation of the pressure line 21 to be connected can take place simply manually without any tools being required. The pressure line 21 is inserted into a circular cylindrical mount for this purpose. On the pushing in, the pressure line 21 is surrounded by at least one annular seal 22 and is simultaneously latched, for example by means of an annular latching ring 25 having inwardly facing latching tongues 26 that are displaced or bent over by the introduced pressure line 21. If the tube is pulled, the latching tongues 26 cant or catch in the surface of the pressure line 21 and prevent a pulling out.

To pull the pressure line 21 out, an annular unlatching device 27 that can likewise be actuated by hand without tools is provided at the pressure port 4. The annular unlatching device 27 is pressed in the direction of the pressure port 4, whereby the latching tongues 26 of the latching ring 25 are removed from the surface of the pressure line 21, whereby the pressure line 21 is no longer latched and the pressure line 21 can be removed and pulled out of the pressure port 4 simply by hand.

Due to the simplicity of the pressure port 4 and due to flexible pressure lines 21, the pressure ports 4 can be used simply without the pressure ports 4 having to be exactly positioned and without threaded connections being provided, and the connection can be made without tools.

The pressure ports 4 are preferably provided for a relative pressure measurement, for example. A relative pressure measurement relative to the environment takes place here. In this respect, every pressure measurement cell 5 belonging to the pressure port 4 is read in individually by the control and evaluation unit 3 and the measured value is provided or output by the control and evaluation unit 3 on the output interface 6. A processing, filtering, scaling, and/or calibration takes/take place between the reading and the output, for example.

Figure 7:
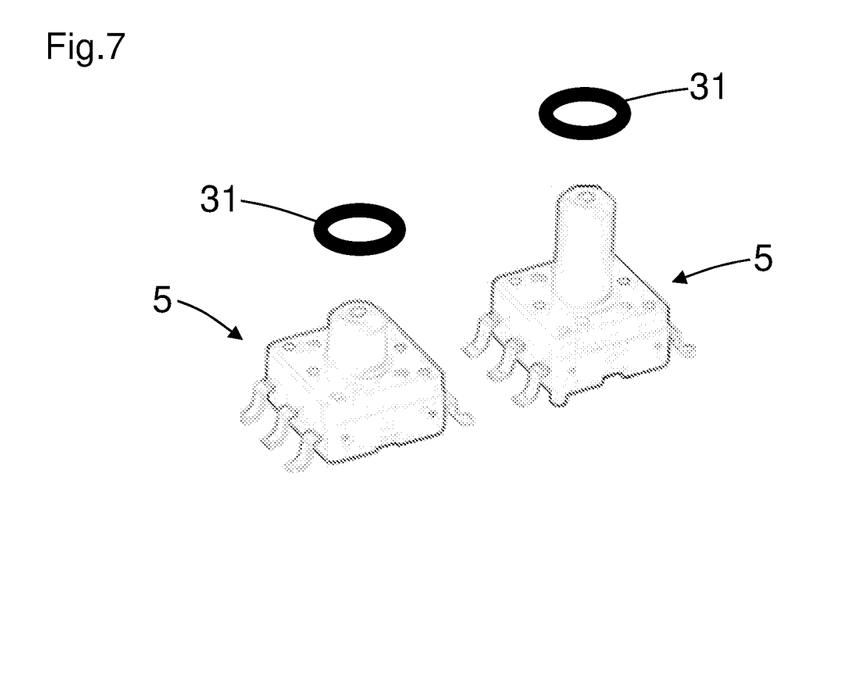
FIG. 7 examples of pressure measurement cells.
Figure 8:
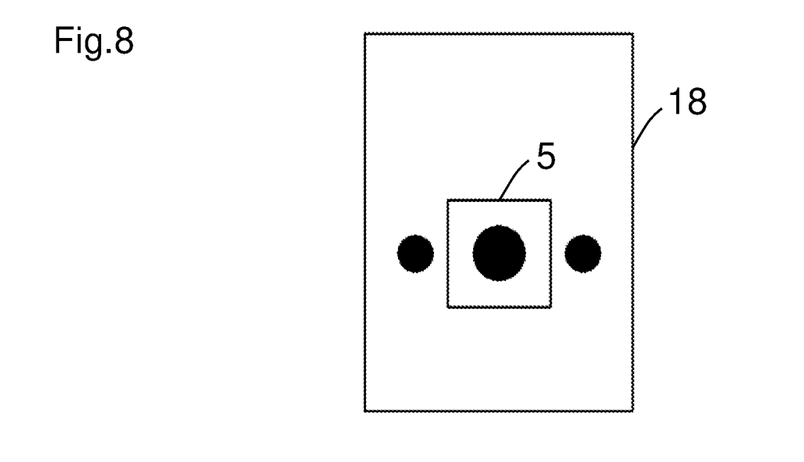
FIG. 8 a schematic representation of a printed circuit board with a pressure measurement cell.

The pressure measurement cell 5 is obtained, for example in accordance with FIG. 7, as an SMD component and is mounted on a printed circuit board 18 in accordance with FIG. 8. An integrated pressure measurement cell 5 can have the following appearance:

The adaptation to the process takes place by means of a mount at the upper side of the SMD component in accordance with FIG. 7 that is integrated with an exact fit and in a pressure tight manner in the housing 2. An O ring 31 is for this purpose, for example, placed around a nose of the pressure measurement cell 5 and takes care of the sealing between the housing 2, in particular the pressure port 4, and the SMD pressure measurement cell, in a cutout in the housing 2. The printed circuit board 18 is then fixedly screwed to the housing 2 in the region of the process port.

This adaptation has to compensate the location tolerances between the printed circuit board 18, the mounting tolerances of the SMD components on the printed circuit board 18, and component tolerances and housing tolerances, and must simultaneously ensure the compressive strength of the process pressure.

In accordance with FIG. 2, at least one further pressure port is a G ¼ IG 8, G ¼ AG 9 or ¼ NPT IO pressure port 4 of the pressure sensor 1. Different connections are thus provided at the pressure sensor 1, whereby the pressure sensor 1 can be used in a more versatile manner.

A G ¼ IG 8 connection is a connection having a ¼ inch internal thread for a high pressure connection. A G ¼ AG 9 connection is a connection having a ¼ inch external thread for a high pressure connection. A ¼" NPT IO connection is a connection having a ¼ inch external thread for a high pressure connection In accordance with FIG. 2, different pressure ports 4 are, for example, associated with different pressure ranges. Different pressure ranges can thereby be evaluated and monitored by a single pressure sensor 1. For example, at least one first pressure range has the range from 0 to 10 bar and at least one second pressure range has the range from 0 to 16 bar. There for further, for example, also pressure ranges from 0 to 1 bar, 0 to 6 bar, 0 to 16 bar, −1 to 0 bar, −1 to 1 bar, or −1 to 10 bar.

A differential pressure measurement can, for example, be carried out between two pressure ports 4. In this process, for example, two pressure ports 4 or two pressure channels are used for the differential pressure measurement. A digital differential pressure measurement takes place here, for example, with two pressure channels or two pressure measurement cells 5 producing a digital differential pressure measurement value as an absolute value in each case. It is, for example, possible for all pressure ports 4, with two pressure ports 4 always forming a differential pressure channel. The differential pressure channel can also be provided for all the measurement ranges.

Two pressure ports 4 or two process connections are provided, for example, per pressure channel in a differential pressure measurement. The pressure sensor 1 can also measure the difference between the two process connections using a single pressure measurement cell 5, that is a relative measurement. In contrast to the absolute measurement, this offers the advantage that only one single pressure measurement cell 5 is required per pressure channel. A differential pressure measurement using two independent pressure measurement cells 5, that is a respective absolute pressure measurement, produces higher measurement accuracy.

A simple flow measurement between two pressure ports 4 can furthermore be provided. A diaphragm is arranged between the pressure ports 4 for this purpose and the pressure measurement cell 5 is configured to determine a flow quantity. This is in particular provided for small measurement ranges from 0 to 0.5 bar.

In accordance with FIG. 4, the output interface is, for example, an IO link interface 11. Up to 32 bytes can be mapped via IO link process data. The number of possible pressure values in the process datum scales in dependence on the transferred pressure values.

As already mentioned, handling units having a large number of pressure measurement sites represent an advantageous use of the multi-channel pressure sensor 1. The pressure sensor 1 is here seated directly on the gripper or robot arm. An actuator system that has to be controlled by a machine control is also located at this position of the handling unit. The pressure sensor 1 provides electrical output signals of the IO link interface 11 to further reduce the cabling effort between the handling unit and the control.

Parameter inputs for the pressure sensor 1 by which a controller can switch the outputs of the pressure sensor 1 are provided via an interface, in particular the IO link interface 11.

Pneumatic valves or electrical actuators can be switched by the output signals of the ID link interface 11. Additional digital input signals can be advantageous to evaluate further sensor signals such as the location information of grippers.

In accordance with FIG. 4, a further output interface is, for example, an Ethernet interface 12.

An Ethernet device can be an intelligent sensor, namely the pressure sensor 1, an actuator, a hub, or, however, due to the bidirectional communication, also a mechatronic component, e.g. a gripper having an Ethernet connection. With respect to an Ethernet device, intelligent means that a device, that is the pressure sensor 1, has identification data, e.g. a type designation and a serial number or parameter data, e.g. sensitivities, switching delays, or characteristics, that can be read or written over the Ethernet protocol. The changing of parameters can thus take place in part in ongoing operation by the PLC. But intelligent also means that the pressure sensor 1 can deliver detailed diagnostic information.

The output interface is optionally a fieldbus interface. Provided fieldbuses are, for example Profibus, Interbus, CANopen, etc.

In accordance with FIG. 2, at least one temperature sensor 16 is arranged in the housing, with the temperature sensor 16 being connected to the control and evaluation unit 3.

The process temperature can, for example, be detected in this process. For example, the temperature of the pressure medium can be directly detected, whereby useful additional information on the process is available.

The environmental temperature can, for example, also be detected. An additional useful process parameter is thus likewise available.

The temperature or temperatures are detected and evaluated continuously or cyclically, for example.

In accordance with FIG. 2, a vibration sensor 17 is arranged in the housing, with the vibration sensor 17 being connected to the control and evaluation unit 3.

The vibration sensor 17 is, for example, directly connected to the housing of the pressure sensor 1. Vibrations of the process that have been caused can thus be recorded and analyzed.

Figure 9:
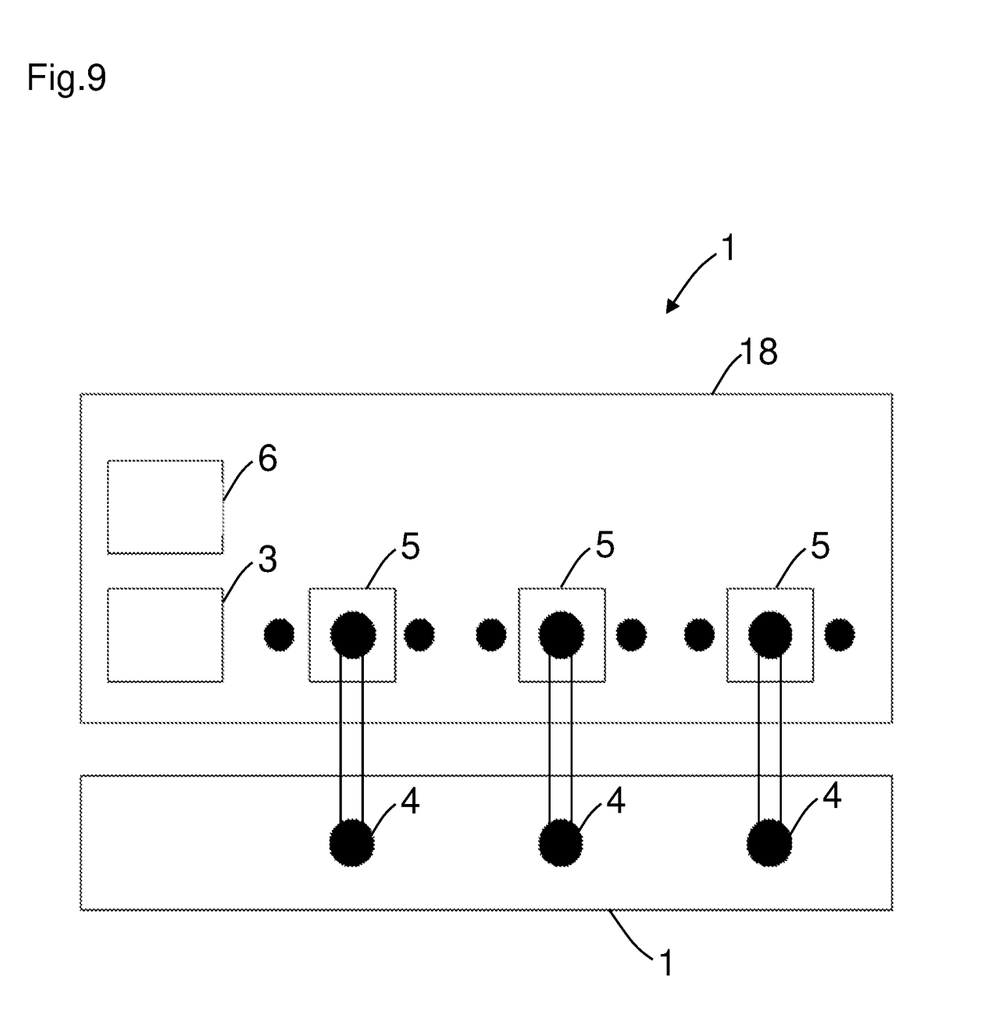
FIG. 9 a schematic representation of a printed circuit board with a pressure measurement cell.

In accordance with FIG. 2 the pressure port 4 of the pressure measurement cells 5 is connected to the housing 2 via a tube 19, with a plurality of pressure measurement cells 5 being fastened to a common printed circuit board 18, in accordance with FIG. 9.

Temperature influences and/or production tolerances between the PCB and the housing 2 can be compensated via a flexible connection between the pressure measurement cell 5 and the housing 2, for example via the tube 19. Mechanical displacements that occur can thus in particular be compensated on large temperature changes.

Figure 10:
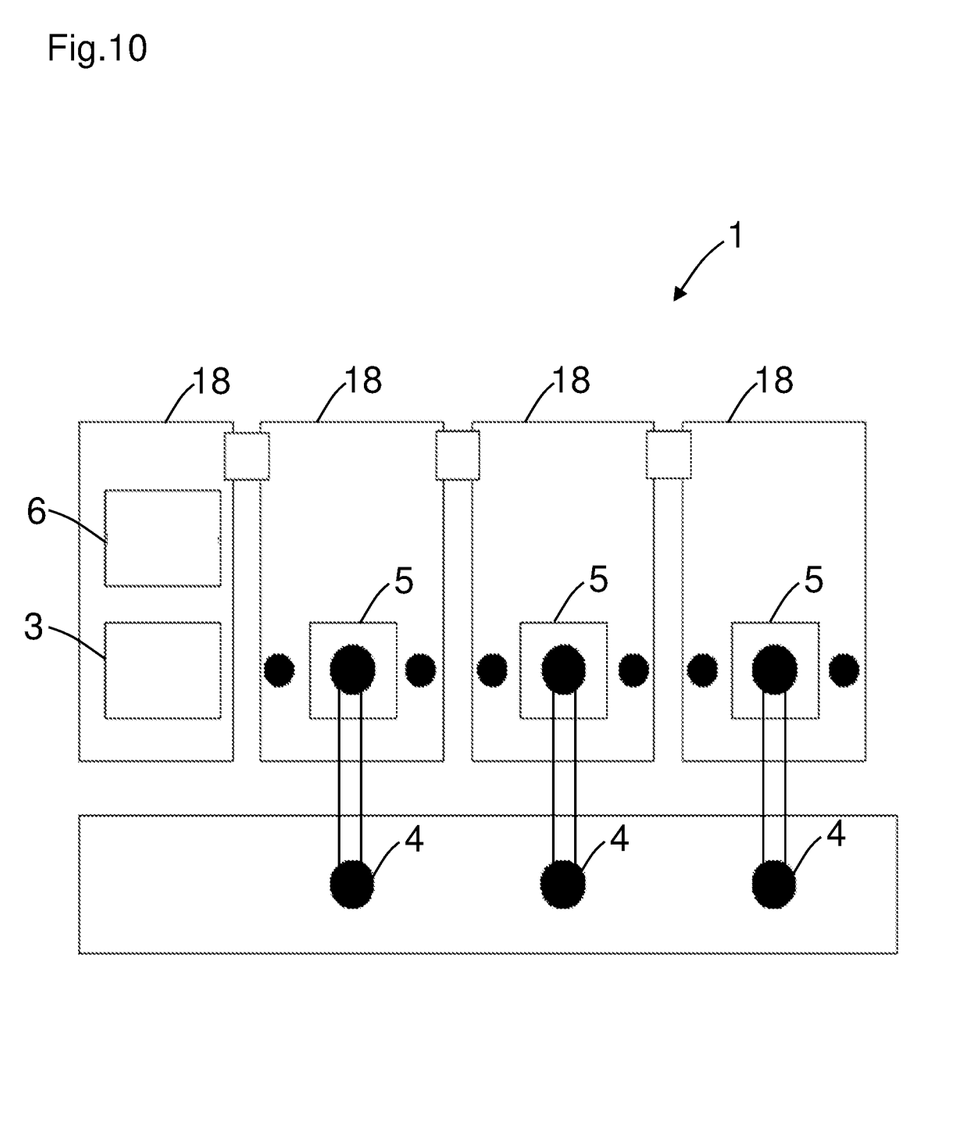
FIG. 10 a schematic representation of printed circuit boards with pressure measurement cells.

In accordance with FIG. 10, the pressure port 4 of the pressure measurement cell 5 is directly connected to the housing and each pressure measurement cell 5 is arranged on a respective separate printed circuit board 18.

The pressure port 4 or process connection of every pressure measurement cell 5 is here directly screwed in the housing 2. The connection of a pressure measurement cell printed circuit board and of a base module printed circuit board takes place, for example, via plug connectors or flat ribbon cables that enable a tolerance compensation.

A cascadable solution is thereby provided with which pressure sensors 1 having a different number of pressure ports 4 can be implemented with an identical internal design. A large number of different variants of pressure sensors 1 can thereby be formed. For this purpose, a base module that is connected to or combined with a number of pressure measurement cells 5 is provided for the production of the pressure sensor 1. A modular system is thus formed.

Figure 11:
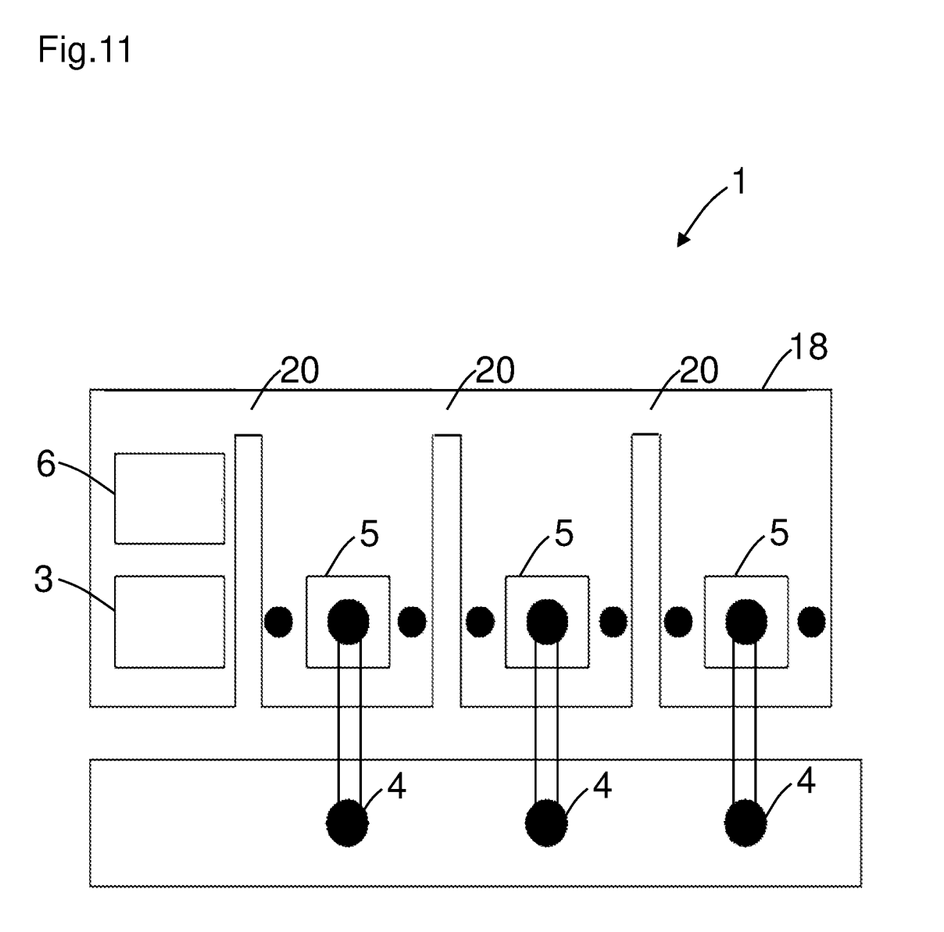
FIG. 11 a schematic representation of a printed circuit board with connection webs and pressure measurement cells.

In accordance with FIG. 11 the pressure port 4 of the pressure measurement cells 5 is directly connected to the housing 2, with a plurality of pressure measurement cells 5 being fastened to a common printed circuit board, 18 with the printed circuit board 18 having connection webs between the printed circuit board parts of the pressure measurement cells 5.

All the components are mounted on one printed circuit board here 18. The tolerance compensation works, for example, by a mechanical relief of the printed circuit board 18 by milled slots, whereby the connection that is left forms the connection web 20, or by partly flexible printed circuit boards e.g. at the connection sites, whereby the connection webs 20 are formed.

Provision can, however, also be made to use only completely flexible printed circuit boards 18.

REFERENCE NUMERALS

1 pressure sensor
2 housing
3 control and evaluation unit
4 pressure port
5 pressure measurement cell
6 digital output interface
8 G ¼ IG
9 G ¼ AG
10 ¼" NPT
11 IO link interface
12 Ethernet interface
14 control buttons
15 display
16 temperature sensor
17 vibration sensor 18 printed circuit board
19 tube
20 connection webs
21 pressure line
22 seal
23 memory
23 program memory
25 latching ring
26 latching tongues
27 unlatching device
28 vacuum gripper
29 programmable logic controller
30 cloud
31 O ring

The invention claimed is:

1. A pressure sensor, comprising:
a housing;
a control and evaluation unit;
a plurality of pressure ports arranged at the housing of the pressure sensor; and
a plurality of pressure measuring cells, wherein each of the pressure measuring cells is in fluid communication with a respective one of the pressure ports,
wherein the plurality of pressure measurement cells are connected to the control and evaluation unit,
wherein the pressure sensor has at least one digital output interface,
wherein at least one of the pressure ports is a port for inserting a pressure line, with the pressure line being installable without tools and with the pressure line being surrounded by a seal of the pressure port and being secured against being pulled out,
wherein the pressure sensor further comprises at least one further pressure port, the at least one further pressure port comprising a G¼ IG, G¼ AG or ¼" NPT pressure port, and
wherein each of the pressure ports has a unique pressure range.

2. The pressure sensor in accordance with claim 1, wherein a first pressure range has the range from 0 to 10 bar and a second pressure range has the range from 0 to 16 bar.

3. The pressure sensor in accordance with claim 1, wherein a differential pressure measurement can be carried out between two of the pressure ports.

4. The pressure sensor in accordance with claim 1, wherein the at least one digital output interface is at least one TO link interface.

5. The pressure sensor in accordance with claim 1, wherein the at least one digital output interface is at least one Ethernet interface screw.

6. The pressure sensor in accordance with claim 1, wherein the at least one digital output interface is at least one fieldbus interface.

7. The pressure sensor in accordance with claim 1, wherein at least one control button is arranged at the housing.

8. The pressure sensor in accordance with claim 1, wherein at least one planar display is arranged at the housing.

9. The pressure sensor in accordance with claim 1, wherein the control and evaluation unit is programmable.

10. The pressure sensor in accordance with claim 1, wherein at least one temperature sensor is arranged in the housing, with the temperature sensor being connected to the control and evaluation unit.

11. The pressure sensor in accordance with claim 1, wherein at least one vibration sensor is arranged in the housing, with the vibration sensor being connected to the control and evaluation unit.

12. The pressure sensor in accordance with claim 1, wherein each of the pressure ports is connected to a corresponding one of the pressure measurement cells and the housing via a tube, with a plurality of the pressure measurement cells being fastened to a common printed circuit board.

13. The pressure sensor in accordance with claim 1, wherein each of the pressure ports is directly connected to the housing and each one of the pressure measurement cells is arranged on a respective separate printed circuit board.

* * * * *

UNITED STATES PATENT AND TRADEMARK OFFICE
CERTIFICATE OF CORRECTION

PATENT NO. : 11,703,409 B2
APPLICATION NO. : 17/585762
DATED : July 18, 2023
INVENTOR(S) : Stefan Schweiger and Thomas Weber It is certified that error appears in the above-identified patent and that said Letters Patent is hereby corrected as shown below:

In the Claims

Claim 4, Column 14, Line 6, please delete the phrase "TO link interface" and replace with "IO link interface".

Signed and Sealed this
Twenty-second Day of August, 2023

*Katherine Kelly Vidal*

Katherine Kelly Vidal
*Director of the United States Patent and Trademark Office*